United States Patent [19]
Yovanovich

[11] 3,736,081
[45] May 29, 1973

[54] APPARATUS FOR CONTINUOUSLY PRODUCING BODIES OF SYNTHETIC THERMOPLASTIC MATERIAL

[75] Inventor: Joseph T. Yovanovich, Rosemont, Pa.

[73] Assignee: Milton Berger, Philadelphia, Pa. ; a part interest

[22] Filed: June 4, 1971

[21] Appl. No.: 149,948

[52] U.S. Cl. .................................425/4 C, 425/371
[51] Int. Cl. .............................................B29d 27/04
[58] Field of Search ...................425/4 C, 817 C, 371

[56] References Cited
UNITED STATES PATENTS

| | | | |
|---|---|---|---|
| 3,142,864 | 8/1964 | Pelley | 425/4 C |
| 3,312,760 | 4/1967 | Berner | 425/817 C |
| 3,215,581 | 3/1963 | Carlson et al. | 425/817 C |
| 3,240,846 | 3/1966 | Voelker | 425/817 C |
| 1,882,052 | 10/1932 | Wyatt | 425/817 C |
| 3,065,500 | 11/1962 | Berner | 425/4 C |

*Primary Examiner*—H. A. Kilby, Jr.
*Attorney*—Louis V. Schiavo

[57] ABSTRACT

A mold channel is formed by attachments carried by two straight runs of a pair of endless articulated link chain belts all moving continuously in the same direction at the same rate of speed through a heating zone. Granules of a synthetic thermoplastic material containing a heat expanding agent are continuously fed into the upstream end of the mold channel, and steam under pressure is introduced into the mold channel through openings in the attachments. Thus the granules of material fed into the mold channel are converted into a coherent foamed agglutinated body. The molded body continuously issuing from the mold channel is received by an endless flat belt conveyor and carried thereby through a coating zone.

5 Claims, 5 Drawing Figures

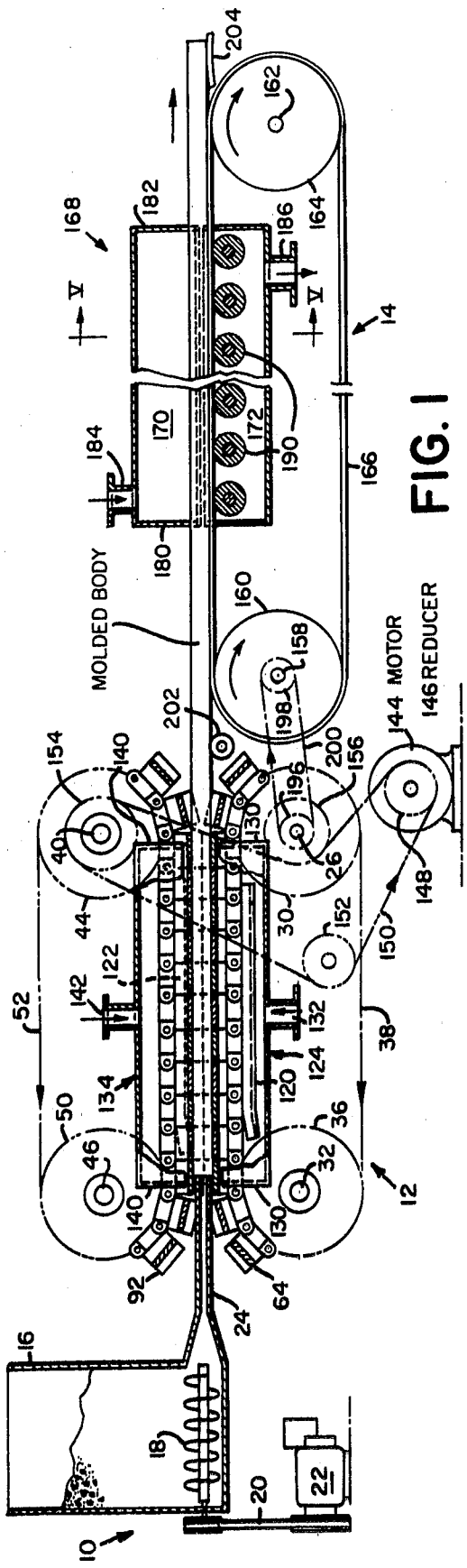
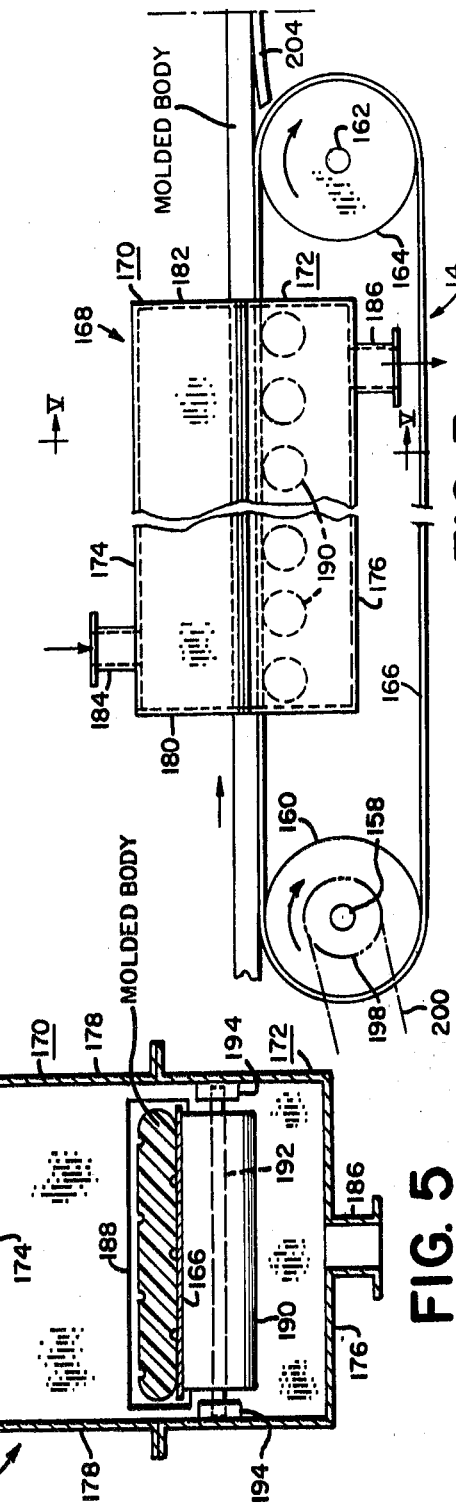
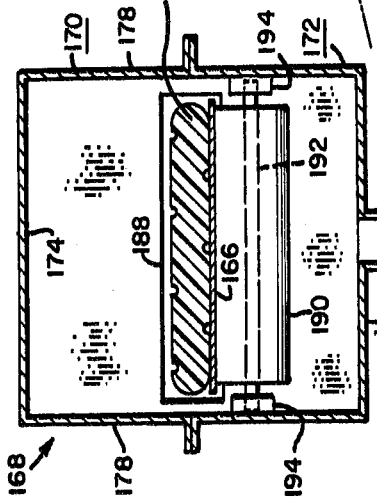
FIG. 1
FIG. 3
FIG. 5
INVENTOR.
JOSEPH T. YOVANOVICH
BY Louis V Schiavo
ATTORNEY.

INVENTOR.
JOSEPH T. YOVANOVICH
BY Louis V Schiavo
ATTORNEY

APPARATUS FOR CONTINUOUSLY PRODUCING BODIES OF SYNTHETIC THERMOPLASTIC MATERIAL

BACKGROUND OF THE INVENTION

1. Field of the Invention

United States Pat. No. 3,383,441, issued to L. S. R. Norrhede et al., May 14, 1968, discloses apparatus for the continuous production of slabs or sheets of any desired length, composed of synthetic thermoplastic granules containing a heat expendable agent, or other polymeric material which is expandable by the application of heat, to form a foamed, coherent porous structure. This application is addressed to improvements in such apparatus.

2. Description of the Prior Art

In the apparatus of the aforementioned patent, opposed vertically spaced runs respectively of a pair of endless flat belts and opposed horizontally spaced runs of a second pair of endless flat belts define the mold channel. Accordingly, the apparatus is limited to the production of slabs or sheets that are rectangular in transverse section. In addition, at least the vertically spaced belts are of a length to extend through both the heating and the cooling zones. Belts of such a length are not entirely satisfactory. The belts wear and must be replaced from time to time. Since the cost of doing so is directly related to the length of the belt, unduly long belts are to be avoided.

SUMMARY OF THE INVENTION

Opposed runs respectively of a pair of endless articulated link chain belts, both moving together through a heating zone in a downstream direction at the same rate of speed, carry two series of attachments which conjointly afford an open ended mold channel which is not limited to one which is rectangular in transverse section.

The apparatus utilizes only one endless flat belt, which is located in the cooling zone. Thus a substantial reduction in the number of endless flat belts utilized is achieved. In addition, the one endless flat belt in the cooling zone does not extend into the heating zone. Accordingly, it is substantially shorter in length.

BRIEF DESCRIPTION OF THE DRAWINGS

FIG. 1 is a vertical longitudinal section through apparatus constructed in accordance with the invention, parts being omitted and others being broken away for the sake of clarity;

FIG. 3 is an elevation of the cooling section of the apparatus shown in FIG. 1, i.e., the section in which the molded body is cooled sufficiently for being cut up into the desired lengths thereof;

FIG. 5 is a vertical transverse section through the apparatus on lines V—V in FIG. 3.

DESCRIPTION OF THE PREFERRED EMBODIMENT

Figure 2:
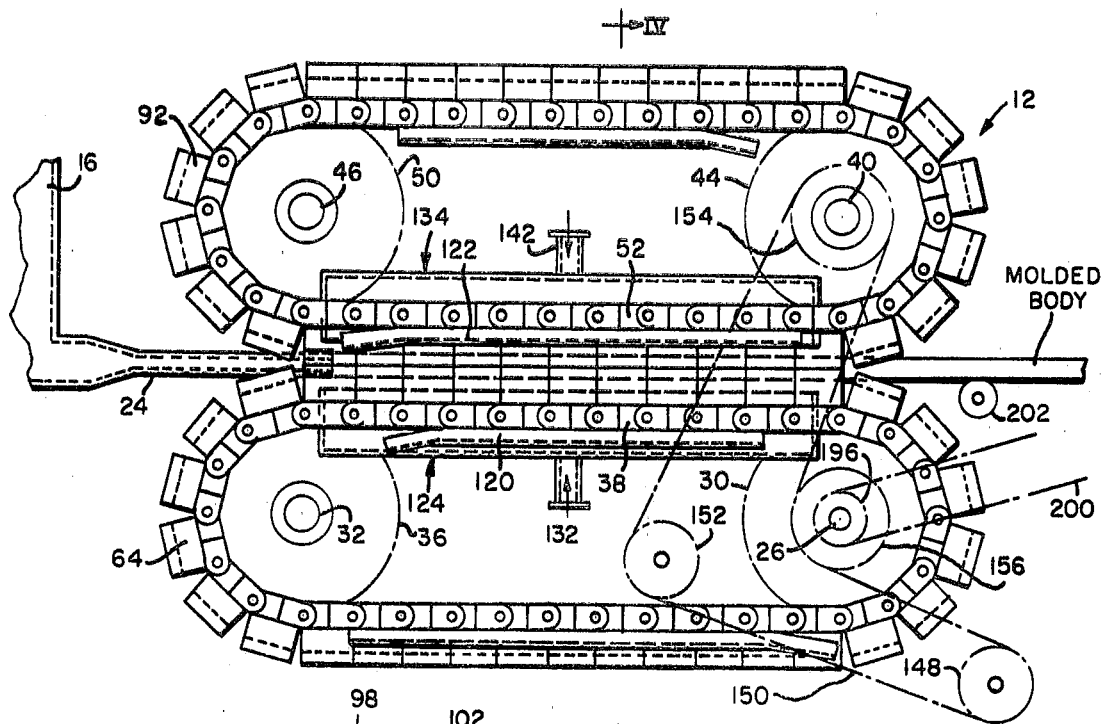
FIG. 2 is an elevation of the heating section of the apparatus shown in FIG. 1, i.e., the section in which the granules of material fed into the mold channel are converted into a coherent foamed agglutinated body.
Figure 4:
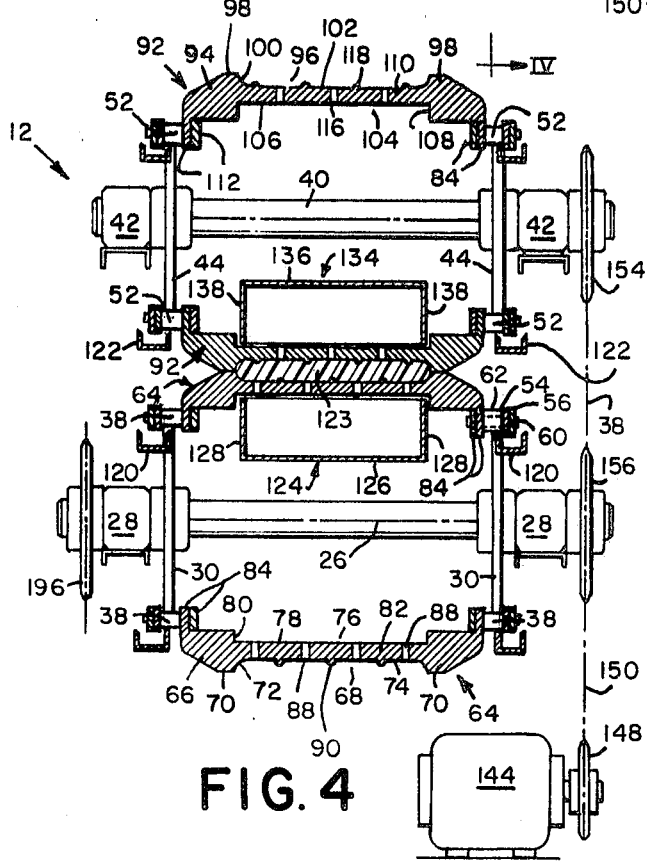
FIG. 4 is a vertical transverse section through the apparatus on lines IV–IV in FIG. 2.

The following description is directed to the specific embodiment of the invention disclosed in the drawings. It is not addressed to the scope of the invention, which may be practiced in a variety of forms.

Apparatus constructed in accordance with the invention comprises serially arranged feeding section 10, heating section 12 and cooling section 14.

The feeding section includes a hopper 16 at the bottom of which is a screw conveyor 18 actuated by a transmission device 20 powered by a variable speed electric motor 22. Material loaded into the hopper 16 is forced by the conveyor 18 through a nozzle 24 into an open-ended mold channel to be described.

The heating section comprises lower and upper continuously moving means. The lower means includes a drive shaft 26 journalled in a pair of bearings 28 and carrying a pair of chain sprockets 30, and a driven shaft 32 journalled in a pair of bearings (not shown) and carrying a pair of chain sprockets 36. Trained about the sprockets 30 and 36 are a pair of articulated link chain belts 38. The upper means includes a drive shaft 40 journalled in a pair of bearings 42 and carrying a pair of chain sprockets 44, and a driven shaft 46 journalled in a pair of bearings (not shown) and carrying a pair of chain sprockets 50. Trained about the sprockets 44 and 50 are a pair of articulated link chain belts 52.

The link chain belts 38 and 52 are identical, each typically including a series of alternate links each comprising an inner bar 54, and a series of intervening links each comprising an outer bar 56. The bars 54 and 56 are suitably provided with bushings (not shown) through which extend pins 60 interconnecting the links and carrying rollers 62.

Suspended between the endless link chains 38 are a series of attachments 64. Each attachment includes a main body part 66 longitudinally recessed, as at 68, and thus provided with a pair of raised walls 70 respectively on opposite sides of the recess 68. The opposed surfaces of the sidewalls 70, designated 72, are rounded and merge smoothly with the bottom 74 of the recess, which is generally flat. In addition, the main body part 66 is longitudinally recessed, as at 76, the recess being provided with a flat bottom surface 78 and opposed opposite side flat surfaces 80. The bottom surfaces of the recesses 68 and 76 define a comparatively thin wall 82. The wall 82 is provided with a multiplicity of openings 88 for a purpose to appear, and the bottom of the recess 68 is provided with three longitudinally extending, laterally spaced raised ribs 90 for a purpose to appear. Each side of the attachment 64 is provided with a longitudinally extending flange 84, the opposite end portions of which overhang the main body 66. The flanges 84 on the same side of each successive pair of attachments 64 are suitably offset for being overlapped and provided with bushings (not shown) through which extend pins 60 interconnecting the flanges 84 and carrying the rollers 62.

Suspended between the endless link chains 52 are a series of attachments 92. Each attachment includes a main body part 94 longitudinally recessed, as at 96, and thus provided with a pair of raised walls 98 respectively on opposite sides of the recess 96. The opposed surfaces of the sidewalls 98, designated 100, are rounded and merge smoothly with the bottom 102 of the recess, which is generally flat. In addition, the main body part 94 is longitudinally recessed, as at 104, the recess being provided with a flat bottom surface 106 and opposed opposite side flat surfaces 108. The bottom surfaces of the recesses 96 and 104 define a comparatively thin wall 110. The wall 110 is provided with a multiplicity of openings 116 for a purpose to appear, and the bottom of the recess 96 is provided with four longitudinally extending laterally spaced raised ribs 118. Each side of the attachment 92 is provided with a longitudinally extending flange 112, the opposite end portions of which overhang the main body 94. The flanges 112 on the same side of each successive pair of attachments 92 are suitably offset for being overlapped and provided with bushings (not shown) through which extend pins 60 interconnecting the flanges 112 and carrying the rollers 62.

Underlying the upper run of each of the link chain belts 38 is a channel or rail member 120. The rollers 62 of the link chain belt 38 travel over one of the flanges of the channel members which serves to support and guide the same. Underlying the lower run of each of the link chain belts 52 is a channel or rail member 122. The rollers 62 of the belt 52 travel over one of the flanges of the channel member, which serves to support and guide the same.

The attachments 64 carried by the upper run of the link chain belts 38 are disposed in end-to-end abutting relation to thus form the lower one-half of a continuous open ended elongated mold channel 123, and the attachments 92 carried by the lower run of the link chain belts 52 are disposed in end-to-end abutting relation to thus form the upper one-half of said mold channel. In addition, the attachments 64 and 92 respectively of said upper and lower runs are disposed in pairs, the attachments of each pair thereof being disposed in registering, mutually overlying relation, thereby to form therebetween a section of the mold channel 123.

Underlying the attachments 64 carried by the upper run of the link chain belts 38 is a steam box 124 provided with a bottom wall 126, opposite side walls 128 and opposite end walls 130. A steam inlet connection 132 is provided in the bottom wall 126. The rim of the steam box extends upwardly into the continuous open ended elongated channel formed conjointly by the recesses 76 respectively in the overlying attachments 64. The side walls 128 of the steam box may be substantially sealed against the opposed surfaces 80 of the recesses 76 by any suitable means. Overlying the attachments 92 carried by the lower run of the link chain belts 52 is a steam box 134 provided with a top wall 136, opposite side walls 138 and opposite end walls 140. A steam inlet connection 142 is provided in the top wall 136. The rim of the steam box extends downwardly into the continuous open ended elongated channel formed conjointly by the recesses 104 respectively in the underlying attachments 92. The side walls 138 of the steam box may be substantially sealed against the opposed surfaces 108 of the recesses 104 by any suitable means.

Reference may be had to the aforementioned patent issued to L. S. R. Norrhede et al. for apparatus suitable for supplying steam under pressure to the steam boxes.

A variable speed electric motor 144 and a change speed unit 146 mounting a power take-off chain sprocket 148 are disposed at the downstream end of the heating section 12. A chain 150 is trained about the sprocket 148, an idler sprocket 152, a sprocket 154 on the shaft 40 and a sprocket 156 on the shaft 26, as shown.

The cooling section 14 comprises a drive shaft 158 mounting a pulley 160, a driven shaft 162 mounting a pulley 164 and a flat endless belt 166 trained about the pulleys 160 and 164. The belt 166 is foraminated, preferably being made of a suitable wire fabric.

Entirely encompassing the upper run of the belt 166 is a cold box, generally designated 168, comprising an upper section 170 and a lower section 172, which conjointly afford a top wall 174, a bottom wall 176, opposite side walls 178 and opposite end walls 180 and 182. The top wall 174 is provided with a cold air inlet connection 184, and the bottom wall 176 is provided with a cold air outlet connection 186. Each end wall 180 and 182 is provided with an opening 188 through which the upper run of the belt 166 and a molded body carried thereby may pass freely. The upper run of the belt 166 is supported upon a set of idler rollers 190 carried by shafts 192 journalled in bearings 194 carried by the side walls 178 of the cold box.

A chain sprocket 196 on the shaft 26 and a chain sprocket 198 on the shaft 158 have trained about them a drive chain 200 for actuating the belt 166.

An idler roller 202 may be suitably interposed between the heating section 12 and the cooling section 14 for a purpose to appear. A receiving table, designated 204, is disposed at the discharge end of the cooling section 14.

The chain 150, actuated by the variable speed electric motor 144 through the change speed unit 146 and the sprocket 148, drives the sprockets 156 and 154, which turn the shafts 26 and 40 and the sprockets 30 and 44 mounted thereon. The chains 38 and 52, actuated by the sprockets 30 and 44, drive the sprockets 36 and 50. The upper run of the belts 38 and the lower run of the belts 52 are supported and guided in their movement by the rails 120 and 122 and move thereover in a downstream direction at the same rate of speed. As the attachments 64 and 92 carried by the belts 38 and 52 turn about the sprockets 36 and 50 to commence their movement in the downstream direction, they register in pairs, each successive pair forming therebetween a section of the mold channel 123. Steam at a suitable temperature and pressure is introduced into the boxes 124 and 134 through the inlet connections 132 and 142. The steam passes through the openings 88 in the attachments 64 overlying the box 124 and forming the lower one-half of the mold channel 123, and through the openings 116 in the attachments 92 underlying the box 134 and forming the upper one-half of the mold channel 123.

The chain 200, actuated by the shaft 26 through the sprocket 196, drives the endless flat belt 166 through the sprocket 198, shaft 158 and pulley 160. The upper run of the belt 166, carried by the series of idler rollers 190, is level with the bottom of the mold channel 123. Air at a suitably cold temperature is introduced into the cold air box 168 through the cold air connection 184 and is discharged therefrom through the cold air outlet connection 186.

Hopper 16 is kept loaded with granules of a synthetic thermoplastic material containing a heat-expanding agent. The screw conveyor 18 feeds these granules from the hopper 16 through the nozzle 24 into the mold channel 123. The steam introduced into the mold channel heats the granules, causing them to soften and expand. Thus they are converted into a coherent foamed agglutinated body which emerges from the mold channel in the form of a molded body of the desired shape in transverse section, passes over the idler roller 202 and onto the flat endless belt 166, which carries the molded body through the cold air box 168. The molded body is discharged from the belt 166 onto a receiving table 204 for being cut up into the desired length.

It will be understood that reference may be had to the aforementioned patent issued to L. S. R. Norrhede et al. for essential features of the method practiced when the apparatus shown and described herein is used for the purpose intended. The apparatus is adapted for continuous production of the molded body. Accordingly, the operation of the screw conveyor 18 for feeding the granules of material into the mold channel 123, actuation of the attachments 64 and 92 for advancing the mass of granules through the heating zone, and actuation of the flat endless belt 166 for moving the molded body which issues from the mold channel 123 through the cooling zone must be suitably synchronized for overall satisfactory operation of the apparatus.

In view of the foregoing, it will be appreciated that the apparatus of the present invention is not limited to the continuous production of molded stock rectangular in transverse section. Apparatus equipped with attachments 64 and 92 will produce a molded stock having a specific shape in transverse section. When it is desired to produce molded stock having a different shape in transverse section, it is merely necessary to substitute for the attachments 64 and 92 a set of suitably different attachments. In addition, it will be appreciated that the number of endless flat belts used is reduced to a minimum, and that the one endless flat belt that is used is confined to the cooling zone. Thus the belt does not pass alternately through the heating zone and the cooling zone. Being confined to the heating zone, it is constantly subjected to substantially the same temperature, and as a consequence it wears longer and has an extended useful life.

While in accordance with the provisions of the patent statutes, I have illustrated and described the best form of the embodiment of my invention now known to me, it will be apparent to those skilled in the art that changes may be made in the form of the apparatus described without departing from the spirit and scope of the invention as set forth in the appended claims, and that in some cases certain features of my invention may be used to advantage without a corresponding use of other features. As shown and described, the apparatus is particularly arranged for continuous manufacture of the stock from which cores for a certain cloth-board reel are made. As disclosed in my copending application, Ser. No. 116,869, filed Feb. 19, 1971, the stock is a board-like member with rounded longitudinally extending narrow edges, and each side of the member is provided with a plurality of laterally spaced grooves or flutes. However, the attachments 64 and 92 not only may be variously formed to produce the same stock material, but may also be formed variously to produce stock material different in transverse section. In addition, instead of making the endless belt 166 of wire fabric, it may be made of various foraminated flexible sheet materials. Furthermore, the idler roller 202 is not essential, while, on the other hand, it may be convenient to use more than one such roller.

I claim:

1. In apparatus for continuously converting granules of a synthetic thermoplastic material containing a heat-expanding agent into a coherent foamed agglutinated body substantially in the form of a flat board the horizontally extending narrow opposite side edges of which are rounded, the combination comprising
   A. a pair of upper and a pair of lower articulated link chain endless belts,
   B. a series of attachments suspended from said upper link chain belts for being successively carried thereby along a lower run thereof in a downstream direction with each successive pair thereof disposed in end-to-end abutting relation,
   C. a series of attachments suspended from said lower link chain belts for being successively carried thereby along an upper run thereof in said downstream direction with each successive pair thereof disposed in end-to-end abutting relation,
   D. means for actuating said upper and lower link chain belts whereby to continuously move said attachments successively in said downstream direction, the attachments moving in said downstream direction being independently effective to conjointly define the whole of a continuous open ended elongated mold channel having closed longitudinally extending narrow opposite sides, said attachments being provided with openings communicating with said mold channel for charging steam into the top and bottom thereof,
   E. means for continuously feeding said granules into the upstream end of said mold channel at a predetermined rate,
   F. a steam box overlying the attachments carried by the lower run of the upper link chain belts, and a steam box underlying the upper run of the lower link chain belts, the interiors of said steam boxes being in communication with said mold channel through said openings in the attachments,
   G. means for receiving a molded body of material as it issues from said mold channel and conveying it in said downstream direction, and
   H. means for cooling said molded body of material as it is moved away from said mold channel.

2. The combination according to claim 1 wherein the attachments carried respectively by said upper and lower link chain belts enter the line of movement of the molded body of material in registering pairs thereof, the attachments of each said pair thereof are disposed in mutually overlying relation to conjointly afford a section of the mold channel, and the upper and lower link chain belts are actuated at the same linear rate of speed.

3. The combination according to claim 2 wherein the attachments suspended from the upper link chain belts are disposed therebetween, the attachments suspended from the lower link chain belts are disposed therebetween, and the attachments of each pair thereof conjointly affording a section of the mold channel are provided with longitudinally extending complementary recesses each of which extends about one-half of the mold channel.

4. The combination according to claim 3 wherein each attachment of each pair thereof affording a section of the mold channel is provided with a pair of longitudinally extending raised walls disposed respectively on opposite sides of the recess therein, and the side walls on each side of the mold channel respectively of said pair of attachments are disposed in mutually overlying abutting relation.

5. The combination according to claim 4 wherein the opposed surfaces of the raised walls respectively on opposite sides of the recess are rounded in transverse section and smoothly merged with the bottom surface of the recess, the radius of curvature being substantially equal to the depth of the recess.

* * * * *